United States Patent
Weinstein et al.

(10) Patent No.: US 8,914,383 B1
(45) Date of Patent: Dec. 16, 2014

(54) SYSTEM AND METHOD FOR PROVIDING JOB RECOMMENDATIONS

(75) Inventors: David Meier Weinstein, Long Beach, NY (US); Thomas Dacre Drapeau, New York, NY (US); Ron Belmarch, New York, NY (US)

(73) Assignee: Monster Worldwide, Inc., New York, NY (US)

( * ) Notice: Subject to any disclaimer, the term of this patent is extended or adjusted under 35 U.S.C. 154(b) by 494 days.

(21) Appl. No.: 10/819,768

(22) Filed: Apr. 6, 2004

(51) Int. Cl.
G06F 17/30 (2006.01)

(52) U.S. Cl.
CPC .................................. G06F 17/3089 (2013.01)
USPC ........... 707/749; 707/737; 707/804; 707/805; 705/7.42

(58) Field of Classification Search
CPC ... G06Q 10/10; G06Q 10/1053; G06Q 30/08; G06F 17/30864; G06F 17/3089
USPC ........ 707/104.1, 3, 6, 10, 100, 737, 749, 804, 707/805; 705/7.42
See application file for complete search history.

(56) References Cited

U.S. PATENT DOCUMENTS

| | | | |
|---|---|---|---|
| 5,062,074 A | 10/1991 | Kleinberger et al. | |
| 5,164,897 A | 11/1992 | Clark et al. | |
| 5,197,004 A | 3/1993 | Sobotka et al. | |
| 5,655,130 A | 8/1997 | Dodge et al. | |
| 5,671,409 A * | 9/1997 | Fatseas et al. | 707/104.1 |
| 5,805,747 A | 9/1998 | Bradford | |
| 5,832,497 A * | 11/1998 | Taylor | 707/104.1 |
| 5,884,270 A * | 3/1999 | Walker et al. | 705/1 |
| 5,931,907 A | 8/1999 | Davies et al. | |
| 5,978,768 A | 11/1999 | McGovern et al. | |
| 6,006,225 A | 12/1999 | Bowman et al. | |
| 6,012,058 A | 1/2000 | Fayyad et al. | |
| 6,026,388 A | 2/2000 | Liddy et al. | |
| 6,052,122 A | 4/2000 | Sutcliffe et al. | |
| 6,144,944 A | 11/2000 | Kurtzman, II et al. | |
| 6,144,958 A | 11/2000 | Ortega | |
| 6,169,986 B1 | 1/2001 | Bowman et al. | |
| 6,185,558 B1 | 2/2001 | Bowman et al. | |
| 6,247,043 B1 | 6/2001 | Bates et al. | |
| 6,263,355 B1 | 7/2001 | Harrell et al. | |
| 6,304,864 B1 | 10/2001 | Liddy et al. | |
| 6,363,376 B1 * | 3/2002 | Wiens et al. | 707/3 |
| 6,370,510 B1 | 4/2002 | McGovern et al. | |
| 6,385,620 B1 | 5/2002 | Kurzius et al. | |
| 6,401,084 B1 | 6/2002 | Ortega et al. | |

(Continued)

FOREIGN PATENT DOCUMENTS

WO WO-0146870 6/2001

OTHER PUBLICATIONS

M. Balabanovic et al. (Mar. 1997). "Fab: Content-Based, Collaborative Recommendation," Communications of the ACM 40(3):66-72.

(Continued)

*Primary Examiner* — Shew-Fen Lin
(74) *Attorney, Agent, or Firm* — Hanchuk Kheit LLP (57) ABSTRACT

A system and method for providing job recommendations based on user behavior or characteristics are disclosed herein. The job recommendations are configured in accordance with a data set based on relational analysis of previous users' activity, or matches between job postings and the user's resume or user profile information. The presentation of job recommendations is triggered, configured, and provided transparently to the user.

23 Claims, 6 Drawing Sheets

(56) References Cited

U.S. PATENT DOCUMENTS

| | | | |
|---|---|---|---|
| 6,412,012 B1* | 6/2002 | Bieganski et al. | 709/232 |
| 6,434,551 B1 | 8/2002 | Takahashi et al. | |
| 6,453,312 B1 | 9/2002 | Goiffon et al. | |
| 6,492,944 B1 | 12/2002 | Stilp | |
| 6,502,065 B2 | 12/2002 | Imanaka et al. | |
| 6,516,312 B1 | 2/2003 | Kraft et al. | |
| 6,563,460 B2 | 5/2003 | Stilp et al. | |
| 6,564,213 B1 | 5/2003 | Ortega et al. | |
| 6,571,243 B2 | 5/2003 | Gupta et al. | |
| 6,603,428 B2 | 8/2003 | Stilp | |
| 6,615,209 B1 | 9/2003 | Gomes et al. | |
| 6,646,604 B2 | 11/2003 | Anderson | |
| 6,658,423 B1 | 12/2003 | Pugh et al. | |
| 6,662,194 B1* | 12/2003 | Joao | 707/104.1 |
| 6,678,690 B2 | 1/2004 | Kobayashi et al. | |
| 6,681,223 B1* | 1/2004 | Sundaresan | 707/6 |
| 6,681,247 B1 | 1/2004 | Payton | |
| 6,697,800 B1* | 2/2004 | Jannink et al. | 1/1 |
| 6,701,313 B1 | 3/2004 | Smith | |
| 6,711,589 B2 | 3/2004 | Dietz | |
| 6,757,674 B2 | 6/2004 | Wiens et al. | |
| 6,782,370 B1 | 8/2004 | Stack | |
| 6,853,982 B2* | 2/2005 | Smith et al. | 705/26.7 |
| 6,853,993 B2 | 2/2005 | Ortega et al. | |
| 6,873,996 B2* | 3/2005 | Chand | 1/1 |
| 6,912,505 B2* | 6/2005 | Linden et al. | 705/14.53 |
| 6,917,952 B1 | 7/2005 | Dailey et al. | |
| 6,963,867 B2 | 11/2005 | Ford et al. | |
| 7,016,853 B1 | 3/2006 | Pereless et al. | |
| 7,043,433 B2 | 5/2006 | Hejna | |
| 7,043,443 B1 | 5/2006 | Firestone | |
| 7,043,450 B2 | 5/2006 | Velez | |
| 7,076,483 B2 | 7/2006 | Preda et al. | |
| 7,080,057 B2* | 7/2006 | Scarborough et al. | 706/60 |
| 7,089,237 B2 | 8/2006 | Turnbull et al. | |
| 7,124,353 B2* | 10/2006 | Goodwin et al. | 715/234 |
| 7,146,416 B1 | 12/2006 | Yoo et al. | |
| 7,191,176 B2 | 3/2007 | McCall et al. | |
| 7,225,187 B2 | 5/2007 | Dumais et al. | |
| 7,249,121 B1 | 7/2007 | Bharat et al. | |
| 7,272,610 B2 | 9/2007 | Torres | |
| 7,424,438 B2 | 9/2008 | Vianello | |
| 7,424,469 B2 | 9/2008 | Ratnaparkhi | |
| 7,487,104 B2 | 2/2009 | Sciuk | |
| 7,680,854 B2 | 3/2010 | Hyder et al. | |
| 7,702,674 B2 | 4/2010 | Hyder et al. | |
| 7,707,203 B2 | 4/2010 | Hyder et al. | |
| 7,720,791 B2 | 5/2010 | Hyder et al. | |
| 2001/0042000 A1 | 11/2001 | DeFoor | |
| 2001/0047347 A1 | 11/2001 | Perell et al. | |
| 2001/0049674 A1 | 12/2001 | Talib | |
| 2002/0002479 A1* | 1/2002 | Almog et al. | 705/8 |
| 2002/0010614 A1 | 1/2002 | Arrowood | |
| 2002/0026452 A1 | 2/2002 | Baumgarten | |
| 2002/0038241 A1 | 3/2002 | Hiraga | |
| 2002/0045154 A1 | 4/2002 | Wood et al. | |
| 2002/0046074 A1 | 4/2002 | Barton | |
| 2002/0055867 A1 | 5/2002 | Putnam et al. | |
| 2002/0055870 A1 | 5/2002 | Thomas | |
| 2002/0059228 A1 | 5/2002 | McCall et al. | |
| 2002/0072946 A1 | 6/2002 | Richardson | |
| 2002/0073160 A1 | 6/2002 | Purcell | |
| 2002/0091669 A1 | 7/2002 | Puram et al. | |
| 2002/0091689 A1 | 7/2002 | Wiens et al. | |
| 2002/0095621 A1 | 7/2002 | Lawton | |
| 2002/0099605 A1 | 7/2002 | Weitzman et al. | |
| 2002/0111843 A1* | 8/2002 | Wellenstein | 705/8 |
| 2002/0120532 A1* | 8/2002 | McGovern et al. | 705/26 |
| 2002/0133369 A1 | 9/2002 | Johnson | |
| 2002/0143573 A1 | 10/2002 | Bryce et al. | |
| 2002/0156674 A1* | 10/2002 | Okamoto et al. | 705/11 |
| 2002/0194161 A1 | 12/2002 | McNamee et al. | |
| 2002/0194166 A1 | 12/2002 | Fowler | |
| 2002/0198882 A1* | 12/2002 | Linden et al. | 707/10 |
| 2003/0009437 A1 | 1/2003 | Seiler et al. | |
| 2003/0009479 A1 | 1/2003 | Phair | |
| 2003/0014294 A1 | 1/2003 | Yoneyama et al. | |
| 2003/0014331 A1 | 1/2003 | Simons | |
| 2003/0018621 A1 | 1/2003 | Steiner et al. | |
| 2003/0023474 A1 | 1/2003 | Helweg-Larsen | |
| 2003/0028529 A1 | 2/2003 | Cheung et al. | |
| 2003/0033292 A1 | 2/2003 | Meisel et al. | |
| 2003/0037032 A1 | 2/2003 | Neece et al. | |
| 2003/0046161 A1 | 3/2003 | Kamangar et al. | |
| 2003/0046311 A1 | 3/2003 | Baidya et al. | |
| 2003/0046389 A1 | 3/2003 | Thieme | |
| 2003/0061242 A1 | 3/2003 | Warner et al. | |
| 2003/0065706 A1* | 4/2003 | Smyth et al. | 709/200 |
| 2003/0066067 A1* | 4/2003 | Gutta et al. | 725/9 |
| 2003/0088465 A1 | 5/2003 | Monteverde | |
| 2003/0093322 A1 | 5/2003 | Sciuk | |
| 2003/0097357 A1 | 5/2003 | Ferrari et al. | |
| 2003/0125970 A1 | 7/2003 | Mittal | |
| 2003/0142128 A1 | 7/2003 | Reulein et al. | |
| 2003/0144996 A1 | 7/2003 | Moore | |
| 2003/0158855 A1 | 8/2003 | Farnham et al. | |
| 2003/0172145 A1 | 9/2003 | Nguyen | |
| 2003/0182171 A1* | 9/2003 | Vianello | 705/9 |
| 2003/0187680 A1* | 10/2003 | Fujino et al. | 705/1 |
| 2003/0195877 A1 | 10/2003 | Ford et al. | |
| 2003/0204439 A1 | 10/2003 | Cullen | |
| 2003/0216930 A1 | 11/2003 | Dunham et al. | |
| 2004/0030566 A1 | 2/2004 | Brooks | |
| 2004/0064477 A1 | 4/2004 | Swauger | |
| 2004/0107112 A1 | 6/2004 | Cotter | |
| 2004/0107123 A1 | 6/2004 | Haffner et al. | |
| 2004/0107192 A1* | 6/2004 | Joao | 707/3 |
| 2004/0111267 A1 | 6/2004 | Jadhav et al. | |
| 2004/0117189 A1 | 6/2004 | Bennett | |
| 2004/0133413 A1 | 7/2004 | Beringer et al. | |
| 2004/0163040 A1 | 8/2004 | Hansen | |
| 2004/0193582 A1* | 9/2004 | Smyth | 707/3 |
| 2004/0210565 A1 | 10/2004 | Lu | |
| 2004/0210600 A1 | 10/2004 | Chand | |
| 2004/0210661 A1 | 10/2004 | Thompson | |
| 2004/0219493 A1 | 11/2004 | Phillips | |
| 2004/0225629 A1 | 11/2004 | Eder | |
| 2004/0267549 A1 | 12/2004 | Anderson et al. | |
| 2004/0267554 A1 | 12/2004 | Bowman et al. | |
| 2004/0267595 A1 | 12/2004 | Woodings et al. | |
| 2004/0267735 A1 | 12/2004 | Melham | |
| 2005/0004927 A1 | 1/2005 | Singer | |
| 2005/0050440 A1 | 3/2005 | Meteyer et al. | |
| 2005/0060318 A1 | 3/2005 | Brickman | |
| 2005/0076293 A1 | 4/2005 | Beresnevichiene | |
| 2005/0080656 A1 | 4/2005 | Crow et al. | |
| 2005/0080657 A1 | 4/2005 | Crow et al. | |
| 2005/0080764 A1 | 4/2005 | Ito | |
| 2005/0080795 A1 | 4/2005 | Kapur et al. | |
| 2005/0083906 A1 | 4/2005 | Speicher | |
| 2005/0091209 A1 | 4/2005 | Frank et al. | |
| 2005/0096973 A1 | 5/2005 | Heyse et al. | |
| 2005/0114203 A1 | 5/2005 | Savitsky et al. | |
| 2005/0120294 A1 | 6/2005 | Stefanison et al. | |
| 2005/0125408 A1 | 6/2005 | Somaroo et al. | |
| 2005/0144394 A1* | 6/2005 | Komarla et al. | 711/137 |
| 2005/0154699 A1 | 7/2005 | Lipkin et al. | |
| 2005/0192955 A1 | 9/2005 | Farrell | |
| 2005/0209955 A1 | 9/2005 | Underwood et al. | |
| 2005/0210514 A1 | 9/2005 | Kittlaus et al. | |
| 2005/0216295 A1 | 9/2005 | Abrahamsohn | |
| 2005/0228709 A1 | 10/2005 | Segal | |
| 2005/0278205 A1 | 12/2005 | Kato | |
| 2005/0278709 A1 | 12/2005 | Sridhar et al. | |
| 2006/0010108 A1 | 1/2006 | Greenberg | |
| 2006/0047530 A1 | 3/2006 | So et al. | |
| 2006/0100919 A1 | 5/2006 | Levine | |
| 2006/0106636 A1 | 5/2006 | Segal | |
| 2006/0112076 A1 | 5/2006 | Burris et al. | |
| 2006/0116894 A1 | 6/2006 | DiMarco | |
| 2006/0133595 A1 | 6/2006 | Ravishankar | |
| 2006/0155698 A1 | 7/2006 | Vayssiere | |
| 2006/0178896 A1 | 8/2006 | Sproul | |
| 2006/0195362 A1 | 8/2006 | Jacobi et al. | |

(56) References Cited

U.S. PATENT DOCUMENTS

| | | | |
|---|---|---|---|
| 2006/0206448 | A1 | 9/2006 | Hyder et al. |
| 2006/0206505 | A1 | 9/2006 | Hyder et al. |
| 2006/0206517 | A1 | 9/2006 | Hyder et al. |
| 2006/0206584 | A1 | 9/2006 | Hyder et al. |
| 2006/0212466 | A1 | 9/2006 | Hyder et al. |
| 2006/0229896 | A1 | 10/2006 | Rosen et al. |
| 2006/0229899 | A1 | 10/2006 | Hyder et al. |
| 2006/0242013 | A1 | 10/2006 | Agarwal et al. |
| 2006/0265266 | A1 | 11/2006 | Chen et al. |
| 2006/0265267 | A1 | 11/2006 | Chen et al. |
| 2006/0265268 | A1 | 11/2006 | Hyder et al. |
| 2006/0265269 | A1 | 11/2006 | Hyder et al. |
| 2006/0265270 | A1 | 11/2006 | Hyder et al. |
| 2007/0033064 | A1 | 2/2007 | Abrahamsohn |
| 2007/0059671 | A1 | 3/2007 | Mitchell |
| 2007/0101065 | A1 | 5/2007 | Walker |
| 2007/0214140 | A1 | 9/2007 | Dom et al. |
| 2007/0273909 | A1 | 11/2007 | Chen et al. |
| 2007/0288308 | A1 | 12/2007 | Chen et al. |
| 2008/0133343 | A1 | 6/2008 | Hyder et al. |
| 2008/0133499 | A1 | 6/2008 | Hyder et al. |
| 2008/0183488 | A1 | 7/2008 | Vianello |
| 2009/0198558 | A1 | 8/2009 | Chen et al. |
| 2009/0248685 | A1 | 10/2009 | Pasqualoni et al. |
| 2009/0276231 | A1 | 11/2009 | Bazigos et al. |
| 2010/0082356 | A1 | 4/2010 | Verma et al. |

OTHER PUBLICATIONS

H. Kawano et al. (Mar. 1997). "Mondou: Web search engine with textual data mining," 0-7803-3905,. IEEE, pp. 402-405.

M. Tanaka et al. (2000). "Intelligent System for Topic Survey in MEDLINE by Keyword Recommendation and Learning Text Characteristics," Genome Informatics 11:73-82.

Donath et al. "The Sociable Web," located at <http://web.web.archive.org/web/19980216205524/http://judith.www.media> visited on Aug. 14, 2003. (4 pages).

Yi Liu et al. (May 2004). "AffinityRank: A New Scheme for Efficient Web Search," AMC 1-58113-912-8/04/0005, pp. 338-339.

Minwen Ji (Nov. 2002). "Affinity-Based Management of Main Memory Database Clusters," AMC Transactions on Internet Technology, 2(4):307-339.

Careerbuilder.com. "My Job Recommendations," located at <http://www.careerbuilder.com/JobSeeker/Resumes/MyNewJobRecommendationsOrganized.aspx?sc_cmp2=JS_Nav_JobsRecs> visited on Oct. 1, 2007. (2 pages).

Careerbuilder.com. "Post Your Resume on CareerBuilder.com," located at <http://www.careerbuilder.com/JobSeeker/Resumes/PostResumeNew/PostYourResume.aspx?ff=2> visited Oct. 1, 2007. (3 pages).

Anonymous. (2006). "Key" Oxford English Dictionary Online, located at <http://dictionary.oed.com>, last accessed on Sep. 23, 2006, thirty-four pages.

Calishain, T. et al. (Feb. 2003). "Google Hacks" First Printing, pp. 18-24, 33, 288-289, 293-297.

Dialog Chronolog. (Sep. 1998). "New Features on DialogWeb™," two pages.

Dialog Information Services. (Jan. 1992). "DialogOnDisc Users Guide," Version 4.0 for DOS, pp. v1, (c), 2-1, 2-2, 3-4, 3-5, 3-9, 3-10, 3-11, 3-15, 3-17, 3-19, 3-21, 4-11, 4-21, 4-22, 4-27, 5-2, 5-7, 5-8, 5-9, 5-10, 5-11, c-2.

Dialog Information Services. (May 1995). "DialogLink for the WindowsTM Operating System User's Guide," Version 2.1 pp. 1-2, 1-3, 4-1, 4-2, 5-2, 5-3.

DialogLink, "DialogLink for Windows and Machintosh: User's Guide", Dec. 1993, Version 2.01, P. (cover sheet), (3-11).

dictionary.oed.com, "Oxford English Dictionary", 1989-1997, Retrieved Sep. 23, 2006, 2nd Ed. 34 pages.

Genova, Z. et al. (Nov. 2002). "Efficient Summarization of URLs using CRC32 for Implementing URL Switching," Proceedings of the 27th Annual IEEE Conference on Local Computer Networks LCN'02, two pages.

Hammami, M. et al. (Oct. 2003). "Webguard: Web Based Adult Content and Filtering System," Proceedings of the IEEE/WIC Conference on Web Intelligence (WI'03), five pages..

Lam-Adesina, A.M. et al. (Sep. 9, 2001). "Applying Summarization Techniques for Term Selection in Relevance Feedback," SIGIR'01, ACM Press, nine pages.

Merriam-Webster.com, "Merriam Webster Thesaurus," located at <http://web.archive.org/web/20030204132348http://www.m-w.com>, visited on Feb. 4, 2003, seven pages.

Netcraft, Site Report for "www.dialoweb.com," (May 10, 1998). located at <http://toolbar.netcraft.com/site_report?url=http://www.dialogweb.com> last visited on Sep. 27, 2006, one page.

OED.com "Definition of prescribed," Dec. 2003, Retrieved Mar. 3, 2008, located at <http//dictornary.oed.com/cgi/ent . . . >, two pages.

Salton, G. (1986). "Abstracts of Articles in the Information Retrieval Area Selected by Gerald Salton," ACM Portal: 39-50.

Sherman, C. (Aug. 23, 2005). "Google Power, Unleash the Full Potential of Google," McGraw-Hill/Osborne, pp. 42-47, 77, 80-81, 100-107, 238-239, 421-422.

Sugiura, A. et al. (Jun. 2000). "Query Routing for Web search engines: Architecture and Experiments," Computer Networks 2000, pp. 417-429, located at www.elsevier.com/locate/comnet.

Thomson Dialog. (2003). "DialogWeb Command Search Tutorial," Dialog Web Version 2.0, located at <http://support.dialog.com/techdocs/dialogweb_command_tutorial.pdf#search=%22dialogweb%202002%22> last visited on Dec. 10, 2002, twenty-three pages.

Thomson Products, Extrinsic Evidence of the Common Ownership and Distribution of DialogWeb & DialogOnDisc, located at <http://dialog.com/contacts/forms/member.shtml>, <http://www.dialog.com/products/platform/webinterface.shtml>, and <http://www.dialog.com/products/platform/desktop_app.shtml>, last visited on Sep. 27, 2006, three pages.

Linden, Greg et al., "Amazon.com Recommendations Item-to-Item Collaborative Filtering", IEEE Internet Computing, vol. 7, No. 1, Jan./Feb. 2003: 76-80. University of Maryland. Department of Computer Science. Dec. 2, 2009 http://www.cs.umd.edu/~samir/498/Amazon-Recommendations.pdf.

International Search Report and the Written Opinion in connection with PCT/US06/08893 mailed Sep. 25, 2007.

International Preliminary Report on Patentability in connection with PCT/US06/08906 mailed Sep. 12, 2007.

International Search Report and the Written Opinion in connection with PCT/US06/08907 mailed Oct. 22, 2007.

International Search Report in connection with PCT/US07/61162.

Office Action issued in connection with U.S. Appl. No. 11/442,443 mailed on Jun. 8, 2010.

Office Action issued in connection with U.S. Appl. No. 11/442,443 mailed on Dec. 8, 2009.

Office Action issued in connection with U.S. Appl. No. 11/136,009 mailed on Nov. 2, 2009.

Office Action issued in connection with U.S. Appl. No. 11/441,997 mailed on Jan. 25, 2010.

Office Action issued in connection with U.S. Appl. No. 11/441,997 mailed on Feb. 19, 2009.

Office Action issued in connection with U.S. Appl. No. 11/441,997 mailed on Apr. 17, 2008.

Office Action issued in connection with U.S. Appl. No. 11/441,639 mailed on Jun. 3, 2010.

Office Action issued in connection with U.S. Appl. No. 11/441,639 mailed on Jan. 29, 2010.

Office Action issued in connection with U.S. Appl. No. 11/441,639 mailed on Sep. 11, 2009.

Office Action issued in connection with U.S. Appl. No. 11/441,639 mailed on Mar. 18, 2009.

Office Action issued in connection with U.S. Appl. No. 11/441,639 mailed on Oct. 14, 2008.

Office Action issued in connection with U.S. Appl. No. 11/441,639 mailed on Apr. 17, 2008.

Office Action issued in connection with U.S. Appl. No. 11/441,638 mailed on Aug. 4, 2009.

Office Action issued in connection with U.S. Appl. No. 11/441,638 mailed on Jan. 26, 2009.

(56) References Cited

OTHER PUBLICATIONS

Office Action issued in connection with U.S. Appl. No. 11/441,638 mailed on Oct. 29, 2008.
Office Action issued in connection with U.S. Appl. No. 11/441,638 mailed on Apr. 8, 2008.
Office Action issued in connection with U.S. Appl. No. 11/135,825 mailed on Aug. 18, 2009.
Office Action issued in connection with U.S. Appl. No. 11/135,825 mailed on Mar. 25, 2009.
Office Action issued in connection with U.S. Appl. No. 11/135,825 mailed on Oct. 27, 2008.
Office Action issued in connection with U.S. Appl. No. 11/135,825 mailed on Apr. 29, 2008.
Office Action issued in connection with U.S. Appl. No. 11/135,825 mailed on Dec. 13, 2007.
Office Action issued in connection with U.S. Appl. No. 11/135,825 mailed on Jul. 3, 2007.
Office Action issued in connection with U.S. Appl. No. 11/174,393 mailed on Aug. 19, 2009.
Office Action issued in connection with U.S. Appl. No. 11/174,393 mailed on Apr. 3, 2009.
Office Action issued in connection with U.S. Appl. No. 11/174,393 mailed on Oct. 24, 2008.
Office Action issued in connection with U.S. Appl. No. 11/174,393 mailed on May 1, 2008.
Office Action issued in connection with U.S. Appl. No. 11/174,393 mailed on Jul. 11, 2007.
Office Action issued in connection with U.S. Appl. No. 11/174,393 mailed on Mar. 9, 2007.
Office Action issued in connection with U.S. Appl. No. 11/174,393 mailed on Sep. 27, 2006.
Office Action issued in connection with U.S. Appl. No. 11/372,528 mailed on Jul. 22, 2010.
Office Action issued in connection with U.S. Appl. No. 11/372,528 mailed on Mar. 4, 2010.
Office Action issued in connection with U.S. Appl. No. 11/372,528 mailed on Oct. 26, 2009.
Office Action issued in connection with U.S. Appl. No. 11/372,528 mailed on Apr. 1, 2009.
Office Action issued in connection with U.S. Appl. No. 11/372,497 mailed on Dec. 17, 2009.
Office Action issued in connection with U.S. Appl. No. 11/372,497 mailed on Aug. 5, 2009.
Office Action issued in connection with U.S. Appl. No. 11/372,497 mailed on Mar. 18, 2009.
Office Action issued in connection with U.S. Appl. No. 11/372,497 mailed on Oct. 23, 2008.
Office Action issued in connection with U.S. Appl. No. 11/442,108 mailed on Jul. 7, 2010.
Office Action issued in connection with U.S. Appl. No. 11/442,108 mailed on Dec. 18, 2009.
Office Action issued in connection with U.S. Appl. No. 11/442,108 mailed on Jun. 18, 2009.
Office Action issued in connection with U.S. Appl. No. 11/173,656 mailed on May 1, 2009.
Office Action issued in connection with U.S. Appl. No. 11/173,470 mailed on Aug. 19, 2009.
Office Action issued in connection with U.S. Appl. No. 11/173,470 mailed on Mar. 31, 2009.
Office Action issued in connection with U.S. Appl. No. 11/173,470 mailed on Oct. 7, 2008.
Office Action issued in connection with U.S. Appl. No. 11/173,470 mailed on May 29, 2008.
Office Action issued in connection with U.S. Appl. No. 11/173,470 mailed on Jan. 4, 2008.
Office Action issued in connection with U.S. Appl. No. 11/173,470 mailed on Jun. 7, 2007.
Office Action issued in connection with U.S. Appl. No. 11/173,470 mailed on Mar. 9, 2007.
Office Action issued in connection with U.S. Appl. No. 11/173,470 mailed on Sep. 29, 2006.
Office Action issued in connection with U.S. Appl. No. 11/173,837 mailed on Aug. 19, 2009.
Office Action issued in connection with U.S. Appl. No. 11/173,837 mailed on Mar. 31, 2009.
Office Action issued in connection with U.S. Appl. No. 11/173,837 mailed on Dec. 11, 2008.
Office Action issued in connection with U.S. Appl. No. 11/173,837 mailed on May 29, 2008.
Office Action issued in connection with U.S. Appl. No. 11/173,837 mailed on Jan. 4, 2008.
Office Action issued in connection with U.S. Appl. No. 11/173,837 mailed on Jun. 6, 2007.
Office Action issued in connection with U.S. Appl. No. 11/173,837 mailed on Mar. 9, 2007.
Office Action issued in connection with U.S. Appl. No. 11/173,837 mailed on Sep. 29, 2006.
Office Action issued in connection with U.S. Appl. No. 12/241,497 mailed on May 14, 2010.
Bettman, James R., "A Threshold Model of Attribute Satisfaction Decisions", Journal of Consumer Research Policy Board, pp. 30-35 (1974).
Official Action issued in connection with U.S. Appl. No. 11/442,443 mailed Oct. 19, 2010.
Official Action issued in connection with U.S. Appl. No. 11/136,009 mailed Sep. 17, 2010.
Official Action issued in connection with U.S. Appl. No. 11/441,997 mailed Sep. 15, 2010.
Official Action issued in connection with U.S. Appl. No. 11/135,825 mailed Sep. 15, 2010.
Official Action issued in connection with U.S. Appl. No. 12/241,497 mailed Sep. 16, 2010.
Official Action issued in connection with U.S. Appl. No. 11/372,497 mailed Sep. 1, 2010.
Official Action issued in connection with U.S. Appl. No. 11/442,443 mailed Mar. 3, 2011.
Official Action issued in connection with U.S. Appl. No. 11/136,009 mailed Jan. 4, 2011.
Official Action issued in connection with U.S. Appl. No. 11/441,997 mailed Dec. 14, 2010.
Official Action issued in connection with U.S. Appl. No. 11/135,825 mailed Feb. 18, 2011.
Official Action issued in connection with U.S. Appl. No. 11/442,108 mailed Jan. 6, 2011.
Official Action issued in connection with U.S. Appl. No. 12/241,497 mailed Mar. 22, 2011.

* cited by examiner

SYSTEM AND METHOD FOR PROVIDING JOB RECOMMENDATIONS

BACKGROUND OF THE INVENTION

The present invention relates to a computer-implemented system for finding employment. More particularly, the present invention relates to providing job recommendations based on information analysis.

In the past, job postings were typically provided via newspapers, bulletin boards, word of mouth, or a recruitment or repository agency. A prospective job seeker would identify job postings of interest through one or more of these means, and follow up either by submitting a resume (or application) or further inquiry regarding the job(s). Identifying and being aware of as many job postings of interest as possible depended to a large extent on looking through as many job postings as possible, even those job postings that may have been filed or categorized dissimilar from what the job seeker considers to be relevant. Guidance or expertise in finding job postings of interest came from the job seeker and/or the organization of the job posting relative to other job postings.

In recent years, paper job postings and other paper documents are provided in electronic format and are accessible via computers. Computers in communication with each other form various networks (e.g., local area network (LAN), wide area network (WAN), Internet) which permit employers, job seekers, and administrators to interact with one another via a central medium. Hence, employers can post jobs; job seekers can view posted jobs and search for jobs; and administrators can format, organize, and store the posted jobs.

However, although computer networks or on-line job sites make it simpler to post jobs and look for jobs, they do not necessarily make identifying relevant job postings any easier. Especially since a greater number of job postings will likely populate the central medium, and conversion to an electronic format does not eliminate variations in word usage or categorization of similar jobs.

BRIEF SUMMARY OF THE INVENTION

In one embodiment of the invention, a method is provided for producing job recommendations. The method includes receiving from a user computer, user profile information provided by an individual user. The method further includes requesting from a database of affinity information, a return of a measure of affinity between the received user profile information and at least one job. The method also includes providing to the user computer, information for at least one of the one or more jobs for which there is at least a prescribed measure of affinity with the received user profile information.

In another embodiment of the invention, a system provides job recommendations. The system includes a database including information associated with pairs of jobs and an affinity score for each of the pairs of jobs. The system further includes a first server configured to provide a job seeking site. The system still further includes a device configured to access the job seeking site by a user of the device. At least one job recommendation is presented at the device from the first server in response to user information provided by the user. The at least one job recommendation has at least a prescribed affinity score with the provided user information, or a prescribed match with the user's profile information or resume. The first server is in communication with the database, and the device is in communication with the first server.

In still another embodiment of the invention, a computer-readable medium containing data structure is provided. The computer-readable medium contains data structure for use by a remotely located computing device, or for use by a server computer coupled to a distributed communications network. In the data structure for use by a remotely located computing device, the data structure includes at least one record stored at a server computer including a unique identifier of a first job, a unique identifier of a second job, and an affinity score between the first and second jobs. The first job and the second jobs are specified by a first user of a job seeking site. The at least the first job is previously specified by a prescribed number of users other than the first user at the job seeking site. In the data structure for use by a server computer coupled to a distributed communication network, the data structure includes at least one record including a unique user identifier and a unique job identifier. The unique job identifier is associated with a particular job that is specified as being of interest to a user associated with the unique user identifier at a job seeking site.

In still another embodiment of the invention, an article of manufacture includes means for monitoring user activity and means for identifying an another job. The means for monitoring monitors user activity to identify a job of interest to a person. The means for identifying identified an another job to the person that is unknown to the person, wherein the another job is potentially of interest to the person based on a preset amount of common interest between the job of interest and the another job by other persons from at least one previous time period. Alternatively, the another job is potentially of interest to the person based on a preset amount of common interest between the another job and the person's resume or profile information.

BRIEF DESCRIPTION OF THE DRAWINGS

The exemplary embodiments will become more fully understood from the following detailed description, taken in conjunction with the accompanying drawings, wherein like reference numerals denote like elements, in which.

In the drawings, to easily identify the discussion of any particular element or art, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE INVENTION

Described in detail below is a system and method for providing job recommendations to a user based on the user's information on an on-line job seeking site. In one embodiment, certain activities by known users previously at the on-line job seeking site are stored and analyzed in an affinity algorithm or engine. The resulting affinity data are utilized to generate job recommendations most relevant to the current user at the job seeking site. The affinity data and job recommendations are dynamically generated and updated. The current user's profile information and/or resume information are also used to generate job recommendations most relevant to the current user at the job seeking site.

Accordingly, the job seeking site identifies to each user a greater number of job postings that may be of interest than what the user may be able to find by himself/herself. Since the affinity data utilized in the job recommendations are based on activity by other users, the resulting job recommendations also represent a collective experience, job seeking thought process, and expertise of a number of people seeking jobs in a similar or the same area as a given user. And due to the nature by which the affinity data and job recommendations are generated, the job recommendations are customized and current for each user of the job seeking site.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
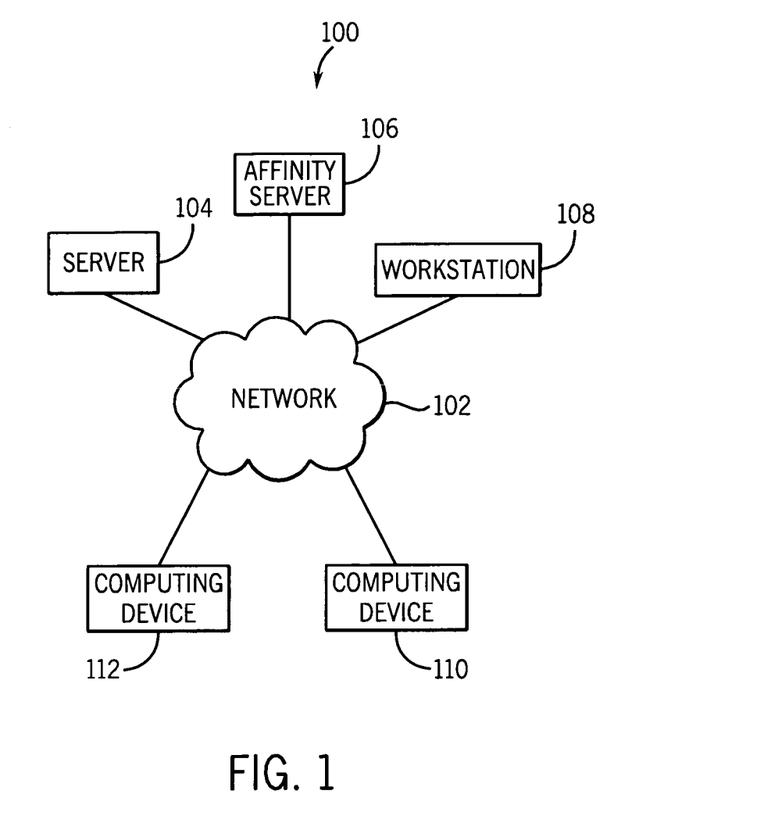
FIG. 1 is a block diagram of one embodiment of a job recommendation system.

Referring to FIG. 1, a block diagram of one embodiment of a job recommendation system 100 is shown. The system 100 includes a network 102 in communication with each of a host server 104, an affinity server 106, a workstation 108, a computing device 110, and a computing device 112. Each of the server 104, server 106, workstation 108, computing device 110, and computing device 112 is coupled to the network 102 via a wired or wireless connection.

The network 102 is a communications network, such as a local area network (LAN), a wide area network (WAN), or the Internet. When the network 102 is a public network, security features (e.g., VPN/SSL secure transport) may be included to ensure authorized access within the system 100.

The host server 104 serves as the intermediary between the users and the affinity data. In one embodiment, the host server 104 is configured to be a web host, which provides for, such as, job postings, job searches, resumes, and other information specified by users of a job seeking site. The host server 104 also interacts with the affinity server 106. The host server 104 is further configured to interface with the workstation 108 and each of the computing devices 110, 112 via the network 102. The host server 104 provides web pages and content associated with the job seeking site to each of the computing devices 110, 112.

The affinity server 106 is configured to provide an affinity engine or algorithm, and store the affinity data generated from the affinity engine. The affinity engine utilized in the server 106 can be an affinity engine as described in commonly owned U.S. patent application Ser. No. 10/417,709, filed Apr. 16, 2003, entitled "Affinity Analysis Method and Article of Manufacture", which is incorporated by reference in its entirety herein. Alternatively, other affinity engines or relationship analyses may be implemented. The host and affinity servers 104 and 106 communicate with each other via the network 102.

The workstation 108; also referred to as a network operator workstation or administrative computer, is configured to access the server 104 or 106 for administration purposes. For example, new or upgraded applications may be uploaded to the servers 104 and 106 from the workstation 108. Operational parameters and/or statistical information may also be gathered from the host and affinity servers 104 and 106 and be provided to the workstation 108.

Each of the computing devices 110 and 112 is configured to provide the job seeking site to each user that initiates access to the job seeking site, and accept and relay user inputs relating to the job seeking site to the host server 104. The job seeking site, to be described in greater detail herein, may be a website comprising a number of web pages including job recommendations. The computing devices 110 and 112 are remotely located from the host and affinity servers 104 and 106, and the administrative workstation 108.

Computing devices 110 and 112 may be a general purpose computer (e.g., a personal computer). Other computer system configurations, including Internet appliances, hand-held devices, wireless devices, portable devices, wearable computers, cellular or mobile phones, portable digital assistants (PDAs), multi-processor systems, microprocessor-based or programmable consumer electronics, set-top boxes, network PCs, mini-computers, and the like may also be implemented to practice aspects of the invention. Computing devices 110 and 112 include one or more applications, program modules, and/or sub-routines. As an example, computing devices 110 and 112 may include an Internet web browser program for accessing the job seeking site. The system 100 may include more or less than two computing devices.

Although not shown, the host and affinity servers 104 and 106 include one or more databases, processors, and other components or modules. Each of the servers 104 and 106 can comprise more than one server. It should also be understood that routers, switches, management components, etc. are present in the system 100 as a distributed computing environment. Job postings, also referred to as jobs, are open job positions requesting applicants that employers have entered into a database maintained and utilized by the job seeking site. The job postings that are accessed by prospective job seekers at the job seeking site and those provided as job recommendations are those job positions within a job seeking site database (e.g., the job seeking site database is associated with the job seeking site, and is a repository of, among other things, the job posting and detailed information about the job postings).

Figure 2:
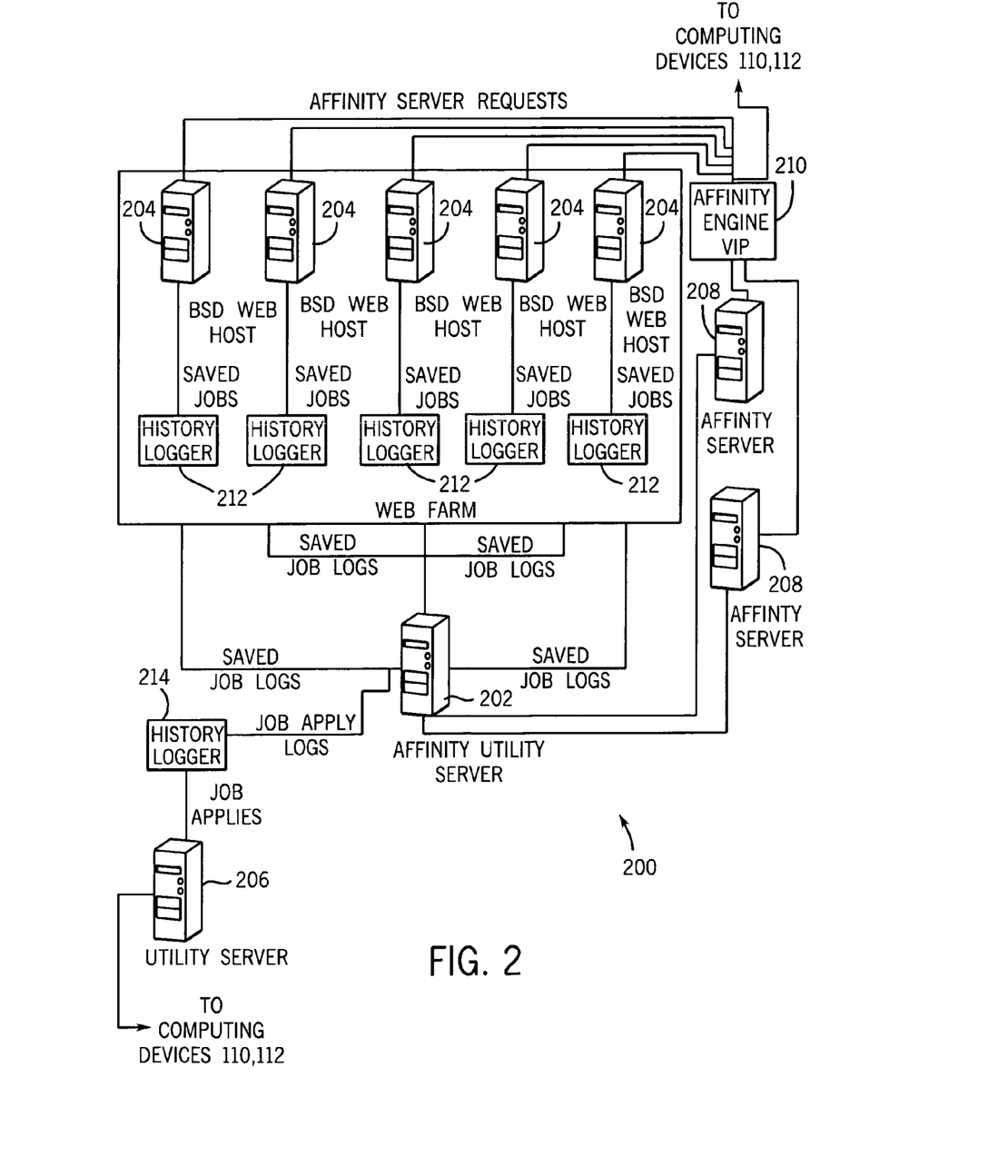
FIG. 2 is a block diagram of another embodiment of the job recommendation system of FIG. 1.

Referring to FIG. 2, an alternative embodiment of the system 100 is shown as a system 200. The system 200 is configured to be an affinity server farm and feed system for job recommendations. The system 200 includes an affinity utility server 202, web host servers 204, a utility server 206, affinity servers 208, an affinity engine 210, saved jobs history loggers 212, and a job applied history logger 214. Each of the web host servers 204, utility server 206, and affinity servers 208 is coupled to the affinity utility server 202. In FIG. 2, two sources of data for affinity analyses are shown (e.g., saved jobs and applied jobs).

Each of the servers 202-208 is configured to include one or more databases, processors, switches, routers, interfaces, and other components and modules. Each of servers 202-208 may comprise one or more servers, or may be combined into a fewer number of servers than shown, depending on computational and/or distributed computing requirements. The affinity utility server 202 is configured to manage the data traffic between the web host servers 204, utility server 206, and affinity servers 208. The web host servers 204 are similar to the host server 104. The utility server 206 may be similar to the host server 104 and also provide maintenance and/or administrative functions, such as, maintaining the job seeking site database or facilitating jobs applied by the users with the respective employers. The affinity servers 208 are configured to accept the affinity feed data and output the affinity data.

Records of saved jobs are given a PHP extension and written as log files to the saved jobs history loggers 212. Although not shown, the saved jobs history loggers 212 are included in the web host servers 204. The web host servers 204 are front-end web servers and may comprise more or less than five servers. One or more of the servers 204 may be back-up servers, or be added to the system 200 as the number of users of the job seeking site increases. The history loggers 212 are applications configured to generate log files on the web host servers 204, serve the log files via a TCP/IP connection to the affinity utility server 202, and roll the log files once they have been served.

Records of jobs applied to are also given a PHP extension and written as log files to the job applied history logger 214. The history logger 214 is included in the utility server 206. The utility server 206 is configured to process job applications, and may be a Solaris server manufactured by Sun Microsystems. The history logger 214 is configured similar to the history loggers 212. More than one server 206 and history logger 214 may be included in the system 200, as necessary to handle the job applications.

The affinity utility server 202 requests the saved jobs and jobs applied to log files from the web host servers 204 and the utility server 206, respectively, to generate a set of affinity data. The log files, also referred to as affinity feed files or data, are aggregated by the affinity utility server 202 and formatted into a format usable to the affinity engine 210. The affinity engine 210 can be included in one or both of the affinity servers 208. Accordingly, the input to the affinity engine 210 comprises the affinity feed data (e.g., saved jobs and applied jobs), and the output of the affinity engine 210 comprises a set of affinity data (also referred to as an affinity data set) that provides a measure of association or frequency of togetherness between job postings that have been saved or applied to.

The affinity feed data and the affinity data set are refreshed at least daily. When there are not enough saved jobs and job applications that occur on a daily basis to generate an accurate affinity data set, saved jobs and job applications from a longer period of time can be used to run the affinity engine 210. For example, a rolling month worth of affinity feed data can be stored at the affinity utility server 202 and used to generate a new affinity data set on a daily basis. The affinity servers 208 can then store the most current affinity data set, from which job recommendations relevant to each user of the job seeking site can be generated.

In order to ensure that only relevant affinity feed data are fed to the affinity engine, not all of the saved jobs and jobs applied to may be utilized. Only those data satisfying certain performance or configuration parameters will be used. In one embodiment, only users registered with the job seeking site can save jobs or apply to jobs. The registration feature permits, among others, for saved jobs and jobs applied to to be associated with particular users, rather than, for example, the same person saving the same job more than once.

Figure 3A:
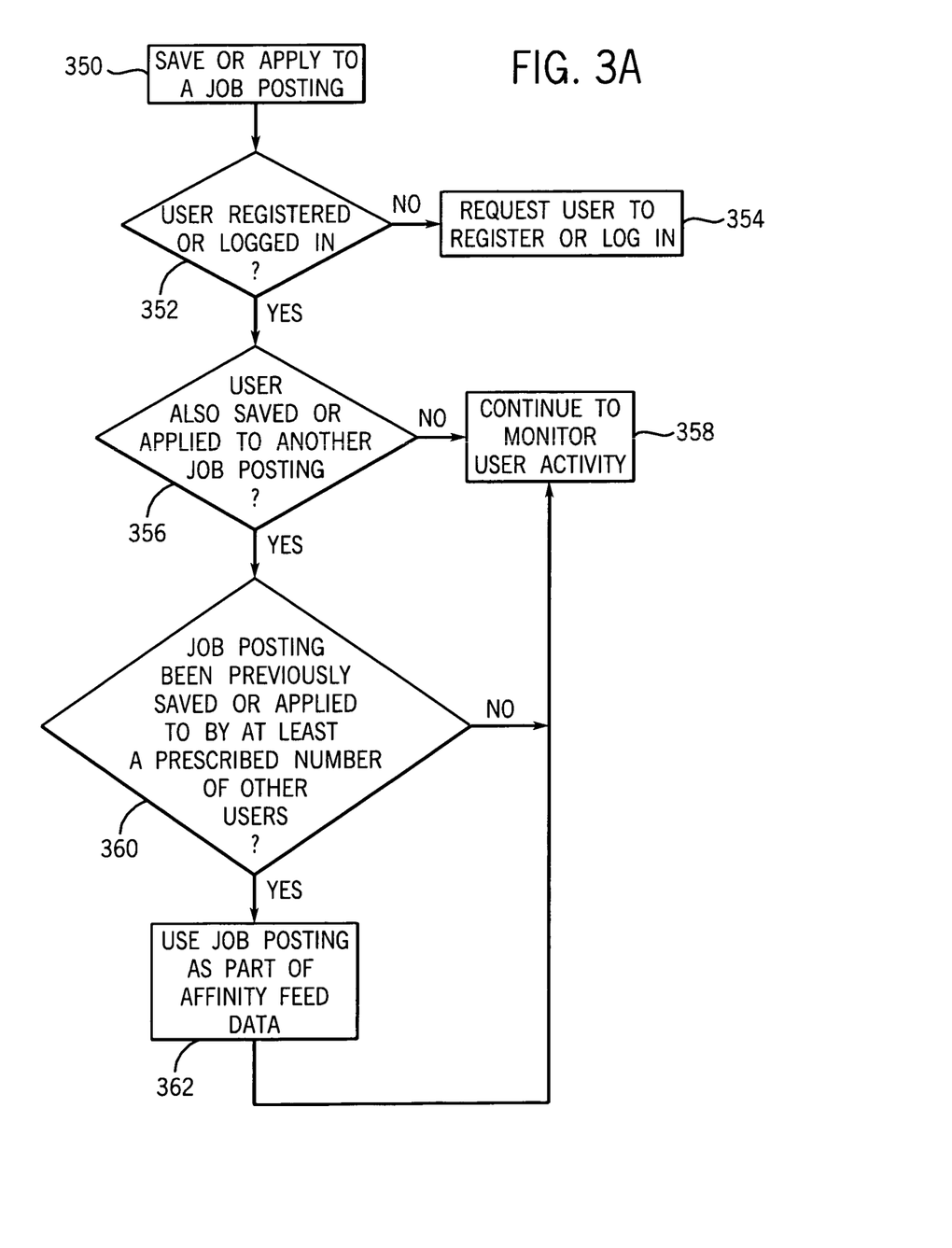
FIG. 3A is a flowchart illustrating collection of affinity feed data using the system of FIG. 1 or 2.

Referring to FIG. 3A, a flowchart illustrating collection of affinity feed data is shown. The flowchart includes a save or apply to block 350, a log in check block 352, a request block 354, a first parameter check block 356, a continue monitoring block 358, a second parameter check block 360, and a log entry block 362.

When a user at the job seeking site saves or applies to a job posting (block 350), a check is performed to see whether the user is registered with the site and is uniquely identifiable (e.g., logged in) (block 352). If the user is not uniquely identifiable, then the site asks if the user would like to register at the block 354.

Otherwise the user is uniquely identifiable and parameters or additional rules regarding inclusion into the affinity feed data are applied. To be used in affinity analysis, the user has saved or applied to another job posting (different from the job posting at the block 350). In other words, at the block 356, a check is performed to make sure that the user has indicated interest in at least a pair of job postings. If the user has not provided an another job posting, then the site continues to monitor user activity at the block 358.

Next, to be used in affinity analysis, the job posting at the block 350 is required to have been also saved or applied to by at least a prescribed number of other users (e.g., three other users) of the job seeking site (block 360). If such requirement is not met, then monitoring of user activity continues at the block 358. Otherwise, the inclusion parameters are met, and the job posting from the block 350 is suitable affinity feed data (block 362).

It is contemplated that parameters other than those in FIG. 3 may be implemented in deciding what user activity is utilized as affinity feed data. Alternatively, one or more of the blocks 356 and 360 may be performed simultaneously, in reverse order, or omitted.

The affinity feed data fed to the affinity engine can be in the following delimited text format:

<user login>^A<job posting index>, where user login is a unique user identifier and the job posting index is a unique identifier of the job posting that the unique user saved or applied to at the job seeking site. The affinity engine analyzes the affinity feed data and calculates a numerical measure of the strength of the affinity or relationship of a given job posting to another job posting.

For example, if the affinity feed data include job postings A, B, and C, then an affinity score between each pair of job postings A to B, job postings A to C, job postings B to C, job postings C to B, job postings C to A, and job postings B to A will be calculated. Continuing the example, job posting A could have a 90% affinity to job posting B, job posting A could have a 40% affinity to job posting C, job posting B could have a 70% affinity to job posting A, etc.

In one embodiment, an affinity score between job postings A and B can be expressed as:

$$\text{Affinity}(A \rightarrow B) = 100 \times (\text{number of people that saved or applied to both } A \text{ and } B)/(\text{number of people that saved or applied to } A)$$

$$\text{Reverse affinity}(B \rightarrow A) = 100 \times (\text{number of people that saved or applied to both } A \text{ and } B)/(\text{number of people that saved or applied to } B).$$

Each record of the affinity feed data can also include a date and time field. Additional fields to specify the pairing of a job posting to another job posting for a given user may also be included in each record of the affinity feed data. In one embodiment, for the output of the affinity engine, each record of the affinity data set includes: an affinity score, a unique identifier of the first job posting of the pair of job postings, a unique identifier of the second job posting of the pair of job postings, and a field (if not otherwise notated from, for example, the order of the other fields in the record) specifying the affinity order (e.g., A→B or B→A) between the two job postings. It is appreciated that other fields may also be included in the affinity data set, or information regarding the job postings may be obtained by linking to the database containing the job posting details.

Figure 3B:
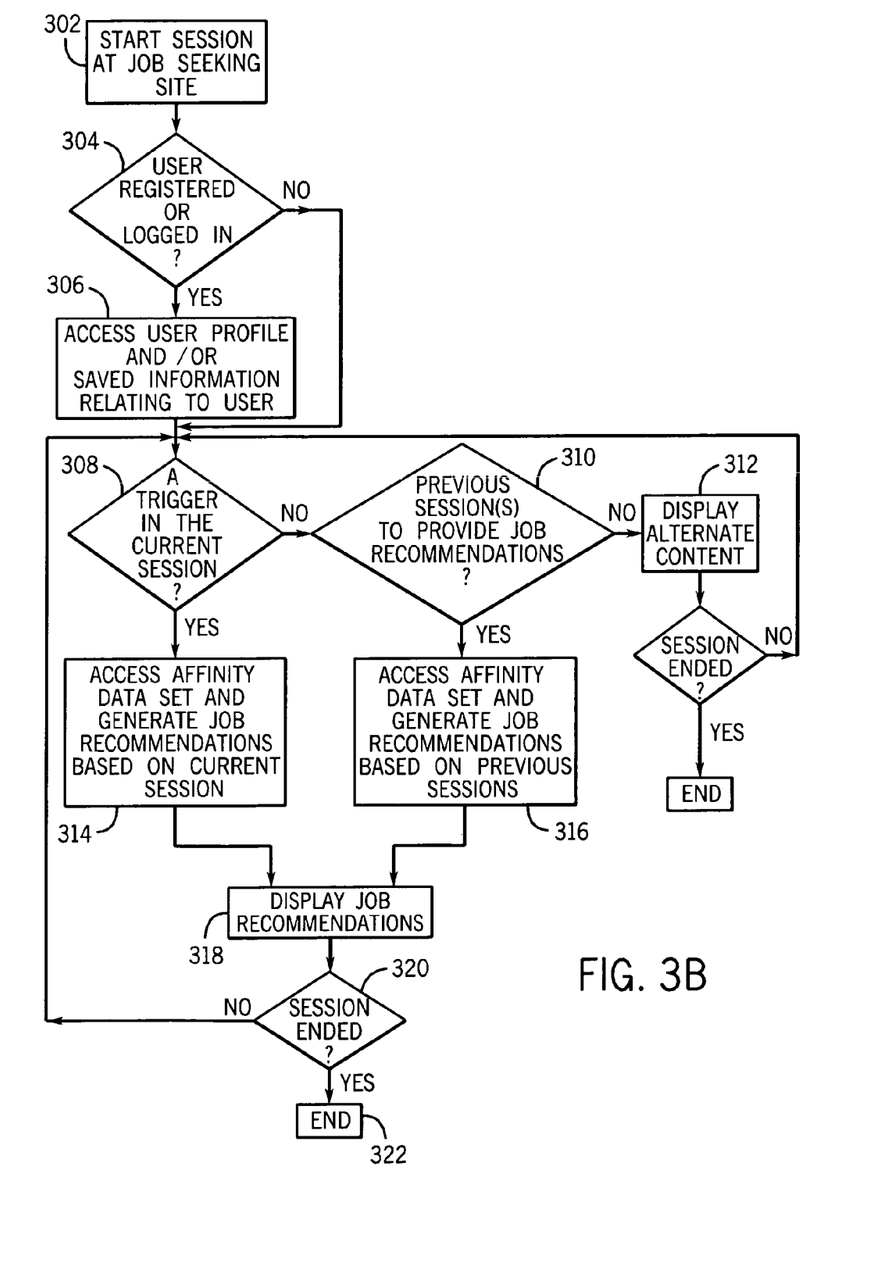
FIG. 3B is a flowchart illustrating the implementation of the job recommendation system of FIGS. 1 and 2.

Referring to FIG. 3B, there is shown one embodiment of a flowchart illustrating an implementation of the job recommendation feature. The flowchart includes a start session block 302, a user registration inquiry block 304, an access user profile block 306, an activity trigger inquiry block 308, a previous session(s) activity inquiry block 310, a display alternate content block 312, an access affinity data set block 314, an access affinity data set block 316, a display job recommendations block 318, an end session inquiry block 320, and an end block 322.

At the start session block 302, a user starts or initiates a session at the job seeking site. As an example, the user can enter the URL address of the job seeking site at the computing device 110.

After a session is started at the job seeking site, the user is prompted to register or log in (if already registered) at the inquiry block 304. The user can continue to access and navigate through the job seeking site without registering or logging in. However, in order for the user to save at least part of his/her session (e.g., save a job search, save job postings found at the job seeking site, save a resume, apply to jobs, etc.), the user needs to be uniquely identifiable (e.g., registered and logged in). Hence, the inquiry block 304 may occur after the start session block 302 and/or after a save has been initiated by the user (e.g., after the block 308).

Figure 4:
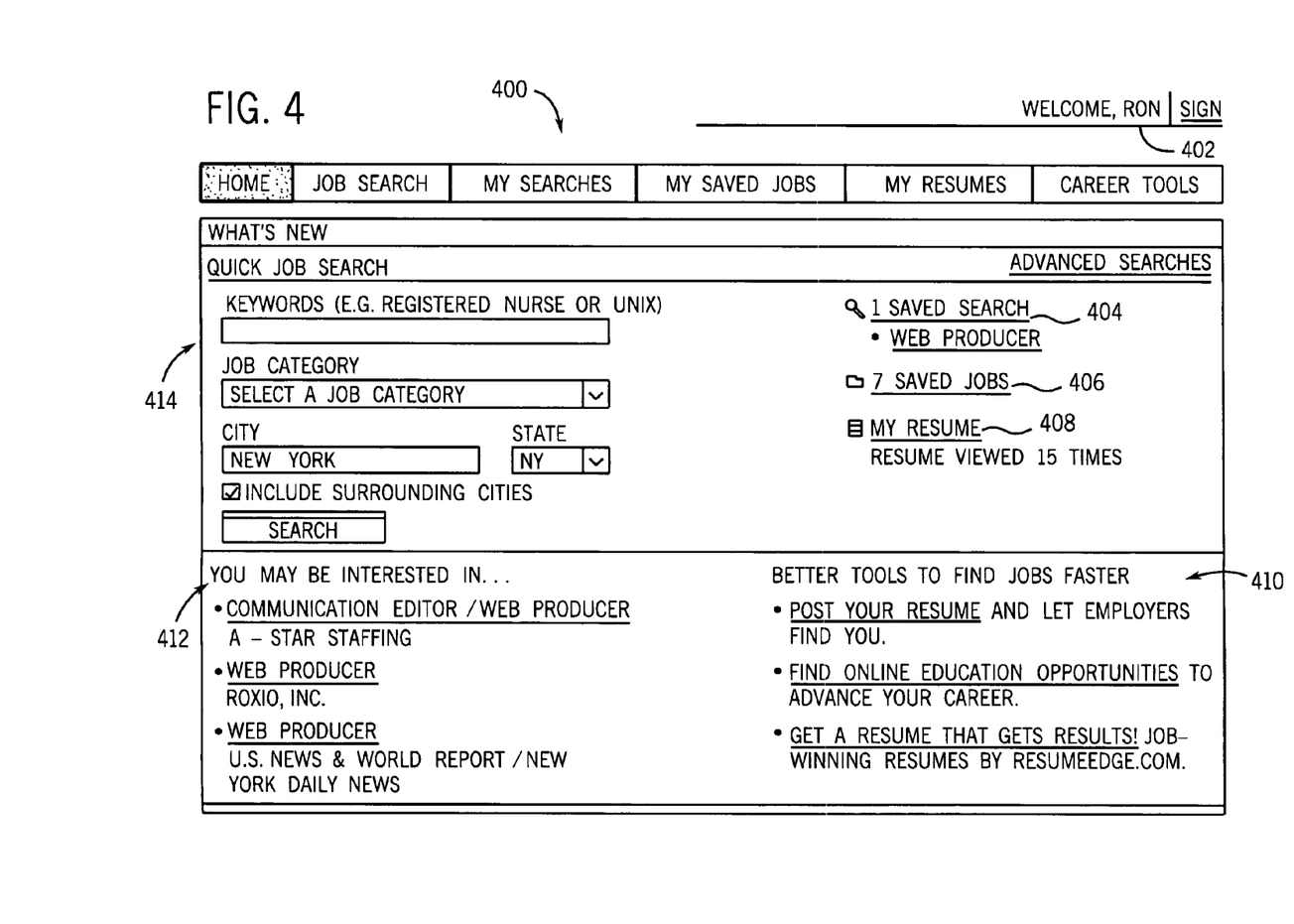
FIG. 4 is a screenshot of a webpage of a job seeking site that provides job recommendations.

If the user does not wish to register or log in, the user is permitted to continue to navigate within the job seeking site (to block 308). Otherwise, the user can register or log in to identify him/herself to the job seeking site. At the block 306, a user profile and other information relating to the registered user is accessed. The accessed information can be displayed at the job seeking site to customize the job seeking site for the user or to provide ready access to previously saved searches, resumes, etc. In FIG. 4, a screenshot of a webpage 400 of the job seeking site is shown. The webpage 400 includes accessed information for a registered user named "Ron" (e.g., text 402), such as a saved search icon 404, a saved jobs icon 406, and a my resume icon 408.

The registration information for each user can include a variety of personal, demographic, and preference information. For example, registration information can include name, address, birth date, gender, email address, household income, preferred music style, etc. The registration feature and/or the registration information may be provided by and maintained, respectively, by a server discrete from the web host server and the affinity server associated with the job seeking site or job recommendation feature. Alternatively, the web host server may provide the registration/log in feature.

Next, as the user navigates the job seeking site, the job seeking site monitors for an event or user activity that will trigger job recommendations at the block 308. If there is no triggering event in the current session, then previous session(s) activity is checked at the block 310. Since the job seeking site reserves space for job recommendations, the previous session(s) may be able to provide job recommendation content to post in the reserved space. If the previous session(s) also cannot provide job recommendations, then alternate content is displayed at the reserved space (block 312). The alternate content can be a variety of content such as, but not limited to, links to related websites, tools and suggestions for using the job seeking site, advertisement, etc. In the webpage 400, an alternate content 410 is provided in the bottom portion of the page reserved for job recommendations, comprising tools or links to find jobs faster. In the webpage 400, the reserved space is utilized to provide both the alternate content 410 and job recommendations 412. As such, in another embodiment, the alternate content may be some preset or default content that is provided regardless of the job recommendations. In another alternate embodiment, the reserved space may be dynamically eliminated if no job recommendations can be made.

In the block 308, user behavior, characteristics, and/or preferences (collectively referred to as user information) that could trigger job recommendations include, but are not limited to, any one or more of: webpage views, job searches, viewing a job posting, applying to a job posted, saving specific job postings for future viewing, saving job searches, creating a job search agent (e.g., conducting one or more searches at the job seeking site, having such searches conducted automatically on a periodic basis, and having the search results emailed to the user), certain resume fields in submitted resume (e.g., current or desired occupation, experience level, skills, management experience, specialty, degrees, certifications, current job title and geographic location, desired geographic location, etc.), profile information (e.g., current and desired geographic information), registered user information (e.g., industry and occupation, geographic location), and behavior in other websites associated or within the same network as the job seeking site (e.g., the job seeking site could be hotjobs.com and hotjobs.com is part of yahoo-.com or the yahoo network, such that purchasing history or searches or other webpages viewed within the yahoo network can be used at hotjobs.com).

As an example, in the webpage 400, job searches can be carried out via a job search feature 414. The job search feature 414 includes searching by keywords, job category (e.g., legal, corporate, medical, clerical, etc.), and/or geographic location. The job search feature 414 searches all the jobs posted with the job seeking site, and outputs a list, description, and links to all job postings matching the search parameters (not shown).

Figure 5:
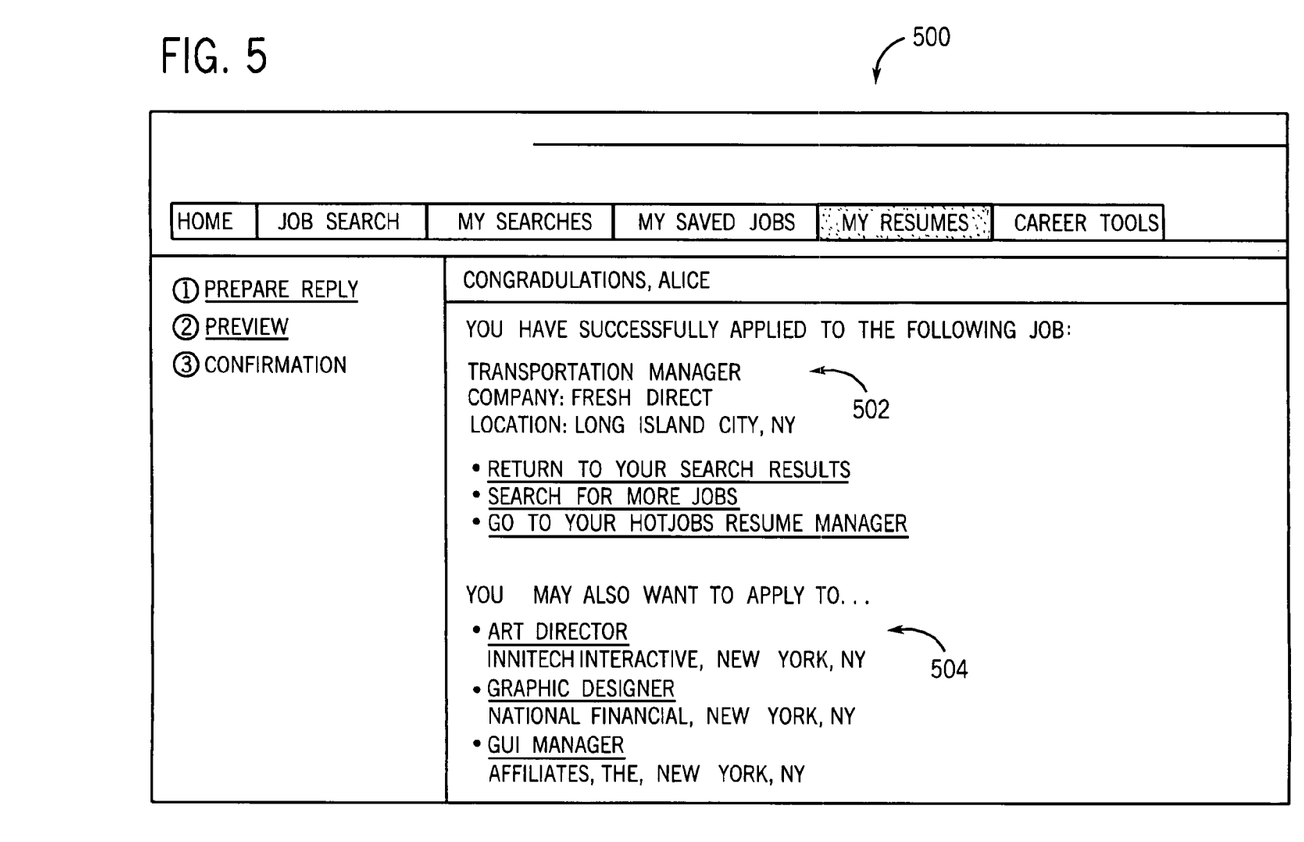
FIG. 5 is another screenshot of a webpage of the job seeking site that provides job recommendations.

As another example, in FIG. 5, a webpage 500 of the job seeking site illustrating a job applied confirmation 502 is shown. In the webpage 500, a user registered and identified as "Alice" has applied for a job that is posted with the job seeking site. Notice that in order to successfully apply to a job, the user is required to be registered and logged in so as to be uniquely identifiable.

Once a user behavior triggering job recommendations (at the block 308) has occurred, generation of job recommendations is initiated at the block 314. Job recommendation generation occurs automatically and transparently without prompting by the user and without interference with the user's interaction with the job seeking site. Moreover, because the job recommendations generated are tailored to the user, irrelevant job recommendations are kept to a minimum.

Although certain user information triggers presentation of job recommendations, a bank of possible job recommendations can already exist in the background. This bank of possible job recommendations includes, but is not limited to:

| Rank | Possible Job Recommendations |
|---|---|
| 1 | Affinity matches from most recent job applied to. |
| 2 | Affinity matches from other (e.g., previous) jobs applied to. |
| 3 | Affinity matches from most recently saved jobs. |
| 4 | Affinity matches from other (e.g., previous) saved jobs. |
| 5 | Affinity matches from hidden job search matches based on user's resume information. |
| 6 | Affinity matches from hidden non-searchable user's resume information (e.g., various resume fields from the user's resume, in which the user has specified that his resume not be included in the job seeking site's resume searchable database). |
| 7 | Affinity matches from most recently saved job search matches. |
| 8 | Affinity matches from other saved search matches. |
| 9 | Matches between certain fields of job pbstings saved in the job seeking site database and certain fields of the user's profile information, resume, and/or registration information. |

The bank of possible job recommendations can include job recommendations obtained with or without affinity analysis.

For example, ranked item 9 above represents job recommendations obtainable by matching fields in job postings with the user's resume, profile information, and/or registration information. And hence, affinity analysis (and affinity matching) is not necessary. It is understood that the ranking of possible job recommendations can be different from that shown above. For example, ranked item 9 may be prioritized to ranked item 2.

In addition, the job recommendations actually presented to the user can be restricted to certain rules for further relevance to the user. The rules can include, but are not limited to, one or more of:

Only affinity matches meeting an affinity score threshold (e.g., 50% or higher affinity score).

If possible, there should never be more agency jobs (e.g., jobs offered through an employment agency) than corporate jobs.

If possible, each of the presented job recommendations should be from different companies/employers.

Jobs already saved or applied to should not be a job recommendation.

A pre-determined number of job recommendations (e.g., three job recommendations) are randomly selected from the bank of possible job recommendations for each webpage refresh (e.g., for each job recommendation presentation).

Possible job recommendations having a higher rank should be presented more often than those having a lower rank. These rules can be incorporated as the bank of possible job recommendations is configured, or these rules can be applied as possible job recommendations are selected from the bank.

In the block 314, the current affinity data set is accessed from the affinity server(s) to identify job postings that are affinity matches. For example, if a job posting A is of interest to a user and if the affinity data set specifies that an affinity score of 90% exists between the job posting A and a job posting B, then job posting B would be an affinity match (and thus a possible job recommendation) to job posting A. In this manner, a set of job recommendations is identified and presented to the user at the job seeking site (block 318). As shown in the webpage 500 of FIG. 5, job recommendations 504 are displayed in the space reserved for job recommendations in response to user "Alice" applying to a job.

In the block 316, a similar bank of possible job recommendations and rules as discussed above apply with respect to previous session(s) user behavior and profile. And accordingly, a set of job recommendations can be provided to the user even though there is no triggering event in the current session (block 318). As an example, in the webpage 400 of FIG. 4, a set of job recommendations 412 is provided to user "Ron," even though user "Ron" has not saved a job nor applied to a job in the current session. Instead, information known from previous session(s), such as the saved search 404, saved jobs 406, and/or submitted resume 408, is utilized to generate the job recommendations 412.

Lastly, if the current session has ended, then monitoring and tracking for job recommendations can cease (blocks 320 and 322). Otherwise, if the current session has not ended (block 320), then monitoring continues to update or refresh the presented job recommendations.

In this manner, a system and method for providing job recommendations based on user's profile information, user's resume, or affinity or relational analysis is disclosed herein. In one embodiment, the affinity analysis and job recommendations are carried out using computer-executable instructions. The affinity feed data are various user behaviors at the job seeking site, the users being uniquely identifiable users (e.g., registered and logged in users). The job recommendations, on the other hand, can be provided to uniquely identifiable users and unknown users. Depending on the amount of data to be maintained, analyzed, restricted, etc., in order to provide meaningful job recommendations to each user of the job seeking site, hardware, software, and/or firmware is readily flexible due, at least in part, to the distributed computing environment.

From the foregoing, it will be appreciated that specific embodiments of the invention have been described herein for purposes of illustration, but that various modifications may be made without deviating from the spirit and scope of the invention. For example, although specific user behaviors for triggering presentation of job recommendations are discussed herein, other user behaviors may be similarly tracked to generate job recommendations. Accordingly, the invention is not limited except as by the appended claims.

The invention claimed is:

1. A job recommending method comprising:

receiving, by a computing device and from a user computer, user information provided by an individual user, wherein the user information includes an indication of interest in a first job posting provided at a job seeking webpage;

retrieving information of a second job posting, by the computing device and from a database of affinity information, the second job posting associated with a prescribed measure of potential user interest based on a calculated affinity score between the first job posting and the second job posting, wherein the prescribed measure of potential user interest based on a calculated affinity score between the first job posting and the second job posting is calculated based on a number of users having expressed an indication of interest in both the first and second job postings by saving or applying for the first and second job postings and a number of users having expressed an indication of interest in the first job posting, and further wherein said calculated affinity score is calculated based on the user resume information;

determining the prescribed measure of potential user interest based on said calculated affinity score between the first job posting and the second job posting satisfies a job affinity threshold;

communicating, by the computing device and to the user computer, the second job posting as a supplemental job recommendation to the first job posting for displaying in a recommendation portion of the job seeking webpage when the prescribed measure of potential user interest based on said calculated affinity score between the first job posting and the second job posting satisfies the job affinity threshold, wherein the second job posting as the supplemental job recommendation is not a result of any direct employer-user match or requested by the individual user; and communicating, by the computing device, alternative content related to the first job posting in the recommendation portion of the job seeking webpage, when there is no job posting satisfying the job affinity threshold as a supplemental job recommendation to the first job posting.

2. The method of claim 1, wherein the user information includes user personal information.

3. The method of claim 1, wherein the user information includes user job search criteria information.

4. The method of claim 1, further comprising:
requesting, by the computing device and from the database of affinity information, a third job posting having another prescribed measure of potential user interest based on a calculated affinity score between the first job posting and the second job posting by another plurality of users in association with the first job posting; and
communicating, by the computing device and to the user computer, the third job posting as another job recommendation, wherein the third job posting is not requested by the individual user.

5. The method of claim 4, wherein the another prescribed measure of interest can be same or different from the prescribed measure of interest.

6. The method of claim 4, wherein the another plurality of users can be same or different from the plurality of users.

7. The method of claim 1, wherein receiving from the user computer, user information provided by the individual user includes performing a search for job postings matching the user information, the search hidden from the individual user and the search yielding at least the first job posting.

8. The method of claim 1, wherein the alternative content is at least one selected from the following group: links to related websites, tools for using the job seeking webpage, and advertisements.

9. The method of claim 1, further comprising:
adding the second job posting to a ranked bank of possible job recommendations as a first job recommendation;
adding a third job posting to a ranked bank of possible job recommendations as a second job recommendation based on possible job recommendation criteria;
applying a job recommendation rank to each of the first and second job recommendations;
selecting a job recommendation for the user from the ranked bank of possible job recommendations based on the applied job recommendation ranks.

10. A job recommending system comprising:
a database including an affinity score indicative of potential interest in a second job for a plurality of users, the plurality of users having expressed interest in a first job;
a first processor in communication with the database and configured to provide a job seeking site including a recommendation portion of the job seeking site, wherein the first processor executes instructions to:
receive user information from an individual user, the user information including an indication of interest in the first job,
determining the affinity score indicative of potential interest in the second job for the plurality of users satisfies a job affinity threshold, and one of:
communicate to the individual user the second job as a supplemental job recommendation to the first job in the recommendation portion, in response to the affinity score satisfies the job affinity threshold,
the second job as the supplemental job recommendation not being a result of any direct employer-user match or requested by the individual user,
wherein the affinity score is a function of (a) a number of users having expressed an indication of interest in both the first and second jobs and a number of users having expressed an indication of interest in the first job, and (b) the user resume information; and
communicate to the individual user alternative content in the recommendation portion in response the affinity score does not satisfy the job affinity threshold; and a second processor in communication with the database and configured to execute an affinity generation procedure,
wherein inputs to the affinity generation procedure for calculating the affinity score include jobs saved or jobs applied to by the plurality of users accessing the job seeking site for a prescribed period of time, and the jobs saved or jobs applied to by the plurality of users affect the second job provided to the individual user.

11. The system of claim 10, wherein the user information includes user job search criteria information.

12. The system of claim 10, wherein the affinity score can comprise an affinity score of the first job relative to the second job or an affinity score of the second job relative to the first job.

13. The system of claim 10, wherein the user information includes the user saving a job or applying to the job at the job seeking site.

14. The system of claim 10, wherein the user information includes the user's current job title and geographic location in a resume associated with the user at the job seeking site.

15. The system of claim 10, wherein the user information includes at least one of a resume or user profile information.

16. The system of claim 10, wherein the second job is automatically provided on the job seeking site in response to a trigger event associated with the individual user.

17. A non-transitory computer-readable storage medium storing processor executable instructions to:
receive a first indication of user interest in a first job from a first user at a job seeking site;
retrieve information of a second job, wherein
both the first job and the second job are previously viewed by a prescribed number of users other than the first user at the job seeking site;
determining an affinity score based on a number of users having expressed interest in both the first and second jobs by saving or applying to the first and second jobs and a number of users having expressed interest in the first job, the affinity score indicative of implied potential interest in the second job for a plurality of users, the plurality of users having expressed interests in the first job, and further wherein the affinity score is calculated based on the user resume information;
determining the affinity score satisfies a job affinity relevance threshold; and one of:
automatically communicate the second job as a supplemental job recommendation to the first job to the first user in a recommendation portion of the job seeking site in response to the indication of interest by the first user of the first job in response to the affinity score satisfies a job affinity threshold wherein the second job automatically communicated to the first user was not a result of any direct employer-user match or requested by the first user; and
automatically communicate alternative content in the recommendation portion in response to the affinity score does not satisfy the job affinity threshold.

18. The non-transitory computer-readable storage medium of claim 17, further storing an affinity order between the first and second jobs.

19. A job recommending method comprising:
receiving by a processor, a first indication of interest in both a first job posting and a second job posting from a first user at a job seeking website;
receiving by the processor, a second indication of interest in both the first and second job postings from a second user, wherein at least one of the first and second indications of interest comprise jobs saved or jobs applied to;

calculating by the processor, a first and second job affinity score by dividing a number of users who have expressed interests in both the first job posting and the second job posting by a number of users who have expressed interests in the first job posting, wherein the first and second job affinity score is indicative of a user's correlated interest in the second job posting when the user has interest in the first job posting, and further wherein the first and second job affinity score is calculated based on the user resume information;

calculating a reverse first and second job affinity score by dividing the number of users who have expressed interests in both the first job posting and the second job posting by a number of users who have expressed interests in the second job posting, wherein the reverse first and second job affinity score is indicative of a user's correlated interest in the first job posting when the user has interest in the second job posting;

receiving a third indication of interest in the first job posting from a third user at the job seeking site;

retrieving the calculated first and second job affinity score for the first and second job postings;

determining the first and second job affinity score satisfies a job affinity threshold;

automatically communicating by the processor, the second job posting to the third user by displaying the second job posting as a supplemental job recommendation in a recommendation portion of the job seeking website in response to the affinity score is at or above the job affinity threshold; and automatically communicating by the processor, alternative content related to the first job posting to the third user in the recommendation portion of the job seeking website in response to the affinity score is not at or above the job affinity threshold.

20. The method of claim 19, further comprising determining by the processor, an interest order for the first and second job postings, wherein the interest order relates to an order of interest in the first and second job postings by the first user, the second user, and other users.

21. The method of claim 20, wherein determining the interest order comprises the order of interest being in the first job posting before the second job posting, and determining the score relating to interest in the second job posting after the first job posting.

22. The method of claim 19, wherein each of the other users indicates an interest in one of the first job posting, the second job posting, or both the first and second job postings.

23. The method of claim 19, wherein the first indication of interest includes at least one of job search, a user personal information, a resume, saving the first and second job postings, and applying to the first and second job postings.

* * * * *